(12) United States Patent
Dahlhaus et al.

(10) Patent No.: US 9,464,152 B2
(45) Date of Patent: Oct. 11, 2016

(54) FOAM MATERIAL ON THE BASIS OF PHENOLIC RESIN

(71) Applicants: Daniel Dahlhaus, Heiden (DE); Gunda Kuhlmann, Hamm (DE); Rosel Bölke, Herdecke (DE)

(72) Inventors: Daniel Dahlhaus, Heiden (DE); Gunda Kuhlmann, Hamm (DE); Rosel Bölke, Herdecke (DE)

(73) Assignee: HEXION INC., Columbus, OH (US)

( * ) Notice: Subject to any disclaimer, the term of this patent is extended or adjusted under 35 U.S.C. 154(b) by 18 days.

(21) Appl. No.: 14/358,784

(22) PCT Filed: Nov. 14, 2012

(86) PCT No.: PCT/EP2012/004731
§ 371 (c)(1),
(2) Date: May 16, 2014

(87) PCT Pub. No.: WO2013/072047
PCT Pub. Date: May 23, 2013

(65) Prior Publication Data
US 2014/0303269 A1 Oct. 9, 2014

(30) Foreign Application Priority Data

Nov. 18, 2011 (DE) .................. 10 2011 118 821
Nov. 14, 2012 (WO) ................ PCT/EP2012/004731

(51) Int. Cl.
| | | |
|---|---|---|
| C08J 9/14 | (2006.01) |
| C08G 8/10 | (2006.01) |
| C08G 8/34 | (2006.01) |
| C08L 61/14 | (2006.01) |
| C08J 9/00 | (2006.01) |

(52) U.S. Cl.
CPC . *C08G 8/10* (2013.01); *C08G 8/34* (2013.01); *C08J 9/0023* (2013.01); *C08J 9/141* (2013.01); *C08J 9/144* (2013.01); *C08L 61/14* (2013.01); *C08J 2203/14* (2013.01); *C08J 2203/142* (2013.01); *C08J 2361/14* (2013.01)

(58) Field of Classification Search
CPC .......... C08G 8/10; C08G 8/34; C08J 9/0023; C08J 9/141; C08J 9/144; C08J 2203/14; C08J 2203/142; C08J 2361/14; C08L 61/14
See application file for complete search history.

(56) References Cited

U.S. PATENT DOCUMENTS 4,900,759 A * 2/1990 Clark ..................... C08J 9/144
521/131
2014/0093720 A1* 4/2014 Cobb ..................... C08J 9/0061
428/314.4

FOREIGN PATENT DOCUMENTS

| | | |
|---|---|---|
| CN | 101440170 | 5/2009 |
| CN | 101985492 | 3/2011 |
| CN | 102199266 | 9/2011 |
| CN | 102220145 A | 10/2011 |
| GB | 1544411 * | 5/1976 |
| JP | S51148732 | 12/1976 |

OTHER PUBLICATIONS

Zhuang, X. et al., Preparation and Characterization of Lignin-Phenolic Foam, Advanced Material Research, 2011, pp. 1014-1018, vol. 236-238, Trans Tech Inc., Switzerland.

* cited by examiner

*Primary Examiner* — Irina S Zemel

(57) ABSTRACT

Disclosed is a method of preparing a bio-based thermosetting foam material with improved properties, in particular improved flame retardant properties, which method includes the steps of a) producing a prepolymer by condensation of at least one phenolic compound and formaldehyde in a ratio of 1:1.0 to 3.0 using 0.15 to 5 wt % of an alkaline catalyst in the temperature range of 50 to 100° C. until the refractive index of the reaction mixture is 1.4990 to 1.5020, b) adding 2 to 40 wt % of at least one natural polyphenol at a temperature of 50 to 100° C., c) adding 2 to 10 wt % of one or more emulsifiers and mixtures thereof, d) adding 2 to 10 wt % of one or more foaming agents and mixtures thereof and e) adding 10 to 20 wt % of a curing agent and f) curing. All wt % being related to the amount of the raw materials used.

10 Claims, No Drawings

FOAM MATERIAL ON THE BASIS OF PHENOLIC RESIN

RELATED APPLICATION DATA

This application claims the benefit of PCT Application PCT/EP2012/004731 with an International Filing Date of Nov. 14, 2012, published as WO 2013/072047 A1, which further claims priority to German Patent Application No. 10 2011 118 821.9 filed Nov. 18, 2011, the entire content of both are hereby incorporated by reference.

The present invention relates to a foam based on phenolic resins and its use.

Foams based on phenolic resins are essentially used as sealing and insulant in the building construction sector, mining and tunnelling. They are generally fabricated on the basis of aqueous resols, which are processed into a phenolic resin foam with or without heating by using a blowing agent and a curative.

DE 3 718 724 describes the general process for producing phenolic resin foams wherein the first step is to mix a phenol-formaldehyde resin with a blowing agent, an emulsifier and a curative, which is either an inorganic acid or a strong organic acid. The choice of acid depends on the desired curing time and temperature. The blowing agent used is typically a halogenated or non-halogenated aliphatic hydrocarbon.

The object of the present invention is to provide a biobased thermoset foam having improved properties, especially improved flame-retardant properties, coupled with essentially unchanged foam properties.

This object is achieved according to the present invention when the foam is produced by at least the steps of:
a) preparing a prepolymer by condensing at least one phenolic compound and formaldehyde in a ratio ranging from 1:1.0 to 1:3.0 under assistance of 0.15 to 5 wt % based on the amount of employed raw materials of a basic catalyst in the temperature range from 50 to 100° C. until the refractive index of the reaction mixture is in the range from 1.4990 to 1.5020, and then
b) adding from 5 to 40 wt % based on the amount of employed raw materials of at least one natural polyphenol at a temperature of 50 to 100° C.,
c) adding from 2 to 10 wt % based on the amount of employed raw materials of one or more emulsifiers and mixtures thereof,
d) adding from 2 to 10 wt % based on the amount of employed raw materials of one or more blowing agents and mixtures thereof, and
e) adding from 10 to 20 wt % based on the amount of employed raw materials of a curative, and
f) curing.

The foamed resin is obtained by a specific form of condensation reaction between phenol, formaldehyde and one or more renewable raw materials from the group of natural phenols in the presence of a basic catalyst (steps a and b). A foam obtained from this biobased resin (steps c to e) has distinctly improved flame-retardant properties while other properties of the foam, for example thermal conductivity, abrasion resistance, closed-cell content and compressive strength, remain essentially unchanged, and accordingly is very useful for applications protecting against fire, heat, cold and noise.

The prepolymer is prepared by at least one phenolic compound selected from a phenol and/or cresol for example, phenol being preferred for ease of availability, and formaldehyde being condensed in a conventional manner in a ratio ranging from 1:1.0 to 1:3.0. A ratio in the range from 1:1.5 to 1:2.5 is preferred, since the ratio of free formaldehyde to phenol is then ideally balanced and the monomer content of the end product is minimized. The condensation takes place under the influence of 0.15 to 5 wt % based on the amount of employed raw materials of a basic catalyst (e.g. KOH, NaOH, Ba(OH)$_2$, triethylamine), preferably 0.3 to 1.5 wt %. Formaldehyde is added in the temperature range from 50 to 100° C. over a period ranging from 30 to 150 min. Preference is given to temperatures between 75 and 85° C. over a period ranging from 50 to 70 min because they ensure optimum exothermic control of the reaction. The condensation reaction is adjusted such that the refractive index of the reaction mixture is in the range from 1.4990 to 1.5020 and preferably in the range from 1.4995 to 1.5015. The refractive index is a measure of the degree of condensation. The refractive index is measured using an Abbe refractometer at 25° C. in accordance with DIN 51423-2. It is preferable when the free phenol content is already <10% at that stage in order that there may be very little free phenol in the end product.

After the reaction between the phenolic compound and formaldehyde has taken place, from 5 to 40 wt % based on the amount of employed raw materials is added of at least one natural polyphenol selected from cashew nut shell liquid (CNSL), carbohydrates, tannin (e.g. quebracho tannin) and derivatives thereof and/or lignin and derivatives thereof (e.g. sodium lignosulphonate). From 5 to 20 wt % of CNSL, tannin and/or lignin compounds is particularly advantageous, since this was found to afford an even more distinct improvement in the flame-retardant properties of the final foam, leading to wider utility for the product. In addition, CNSL, tannin and/or lignin compounds are naturally renewable raw materials and thus make a contribution to providing the product in an environmentally aware manner. The natural polyphenol is added at a temperature of 50 to 100° C., preferably 75 to 85° C., over a period ranging from 90 to 210 min, preferably 120 to 180 min.

It is advantageous but not absolutely necessary to subsequently cool to 40 to 70° C. and distil under reduced pressure down to a water content of 7 to 20%, so the biobased foamed resin has a viscosity in the range from 2000 to 14 000 mPas, which enables optimum further processing.

The product from steps a) and b) can be stored at low temperatures and used as and when needed.

Step c) comprises the foamed resin of the present invention, which is based on renewable raw materials and was obtained in steps a) and b), being admixed with from 2 to 10 wt % based on the amount of employed raw materials of one or more emulsifiers. It is preferable to use an amount from 4 to 8 wt %. Amounts <4 wt % and >8 wt % do not ensure homogeneous mixing, but instead cause the substances added in steps d) to e) to separate to some extent. The emulsifiers may be selected from adducts of ethylene oxide and/or of propylene oxide on saturated and unsaturated fatty acids, hydroxyfatty acids, fatty alcohols, glycerides or vegetable oils and/or dimethyl phthalate, diethylene glycol, phthalic anhydride and/or mixtures thereof. The emulsifier, or the mixture of two or more emulsifiers is mixed in at a temperature of 20 to 30° C.

Subsequently, in step d), one or more blowing agents and/or mixtures thereof are admixed in a concentration of 2 to 10 wt %, preferably 3 to 8 wt %, based on the amount of employed raw materials. When the concentration of the blowing agent is <2 wt %, foaming of the resin does not take place. A blowing agent quantity >10 wt % makes the pressure in the mould during curing excessive and causes the foam to collapse. The temperature at which the blowing agent is mixed into the foamable resin is in the range from 15 to 25° C. The blowing agent used is a customary substance from the prior art, for example isopropyl chloride, isopentane, cyclopentane, butane, pentane, hexane and/or heptane and/or mixtures thereof.

Incorporating from 10 to 20 wt % based on the amount of employed raw materials of one or more curatives (e.g. inorganic or organic acids such as, for example, phosphoric acid, sulphuric acid, phenolsulphonic acids, p-toluenesulphonic acid, xylenesulphonic acid) into the mixture in step e) and introducing the mixture into a mould causes the foam of the present invention to cure at temperatures of 40 to 70° C. in the usual manner (step f).

In general, further substances such as flame retardants, processing aids, plasticizers, neutralizing reagents or reactivity-influencing additives can be admixed in steps a) to e).

Illustrative embodiments of the present invention will now be more particularly described by way of example:

EXAMPLES

Example 1

Inventive Example (Foamable Resin 1)

In a laboratory reactor equipped with a stirrer, 100 g of phenol were mixed with 109.2 g of formaldehyde (45% strength) and 1.2 g of NaOH (50% strength). This solution is heated to 80° C. and condensed up to a refractive index of 1.5002 and a free phenol content <10%.

After cooling, 20 g of organosolv lignin are added and the mixture is maintained at a temperature of about 80° C. until the free phenol content is <7.5%. This is followed by a distillation under reduced pressure down to a water content of 15.7%.

Example 2

Inventive Example (Foamed Resin 1)

To 542 g of foamable resin 1 was added in succession under agitation 23 g of ethoxylated castor oil, 25 g of dimethyl phthalate and 59 g of a blowing-agent mixture consisting of 85 wt % isopentane and 15 wt % cyclopentane. At the end, 118 g of curative consisting of 80 wt % phenolsulphonic acid and 20 wt % phosphoric acid (75% strength) were stirred in.

The reaction mixture was immediately transferred into a preheated wooden mould at 60° C. and the mould was closed with a wooden lid which was firmly bolted in place. The mould was placed in a heated thermal cabinet at 60° C. One hour later, the foaming process had ended and the foam was removed from the mould. The foam was then left to undergo post-curing in the thermal cabinet at 60° C. for 24 hours. The foam has the following properties:
density=36.2 kg/m$^3$
$\lambda$=35.9 mW/m*K
closed-cell content=93.5%
flame properties: self-extinguishing and non-smoking
spall rate: 1.0%/4:00 min Example 3

Inventive Example (Foamable Resin 2)

Example 1 was repeated in its entirety except that the organosolv lignin was exchanged for pyrolytic lignin.

Example 4

Inventive Example (Foamed Resin 2)

Resin 4 was foamed identically to the formulation of Example 2. The foamed resin has the following properties:
density=47.5 kg/m$^3$
$\lambda$=25.4 mW/m*K
closed-cell content=95.2%
flame properties: self-extinguishing and non-smoking
spall rate: 0.1%

Example 5

Comparative Example (Foamed Resin 3)

In a laboratory reactor equipped with stirrer, 100 g of phenol were mixed with 109.2 g of formaldehyde (45% strength) and 1.2 g of NaOH (50% strength). This solution is heated to 80° C. and condensed up to a refractive index of 1.5476.

This is followed by a distillation under reduced pressure down to a water content of 17.3%.

Example 6

Comparative Example (Foamed Resin 3)

Resin 4 was foamed identically to the formulation of Example 2. The foamed resin has the following properties:
density=42.2 kg/m$^3$
$\lambda$=23.0 mW/m*K
closed-cell content=100.0%
flame properties: self-extinguishing and non-smoking
spall rate: 14.2%/3:20 min The flame properties in the examples were reproducibly tested using an internal method of measurement. This involved igniting the samples and measuring the time for the flame to strike through and/or parts of the sample to spall off.

In summary, using the product of the present invention is found to result in a distinct improvement in flame-retardant properties. This was unforeseeable, since compositions known from the prior art (Examples 5 and 6) gave a distinctly worse spall rate. The insulation properties of the examples which are in accordance with the present invention are comparable to those of the prior art.

We claim:
1. A method for preparing a foam comprising:
a) preparing a prepolymer by condensing at least one phenolic compound and formaldehyde in a ratio ranging from 1:1.0 to 1:3.0 in the presence of 0.15 to 5 wt % based on an amount of employed raw materials of a basic catalyst in a temperature range from 50 to 100° C. to form a reaction mixture until a refractive index of the reaction mixture is in the range from 1.4990 to 1.5020,
b) adding from 5 to 40 wt % based on the amount of employed raw materials of at least one natural polyphenol at a temperature of 50 to 100° C., c) adding from 2 to 10 wt % based on the amount of employed raw materials of one or more emulsifiers and mixtures thereof, d) adding from 2 to 10 wt % based on the amount of employed raw materials of one or more blowing agents and mixtures thereof, and e) adding from 10 to 20 wt % based on the amount of employed raw materials of a curative, and f) curing.

2. The method of claim 1 wherein the ratio of the at least one phenolic compound to formaldehyde is in the range from 1:1.5 to 1:2.5.

3. The method of claim 1 wherein a free phenol content of the prepolymer obtained in step a) is <10%.

4. The method of claim 1 wherein the refractive index is 1.4995-1.5015.

5. The method of claim 1 wherein the natural polyphenol is selected from a tannin or a lignin compound or a cashew nut shell liquid.

6. The method of claim 1 wherein the natural polymer is added in a concentration of 5 to 20 wt % based on the amount of employed raw materials.

7. The method of claim 1 wherein the natural polyphenol is added at a temperature of 75 to 85° C.

8. The method of claim 1 wherein the emulsifier is selected from adducts of ethylene oxide or of propylene oxide on saturated and unsaturated fatty acids, hydroxyl fatty acids, fatty alcohols, glycerides or vegetable oils or dimethyl phthalate, diethylene glycol, phthalic anhydride or mixtures thereof.

9. The method of claim 1 wherein the blowing agent is selected from isopropyl chloride, isopentane, cyclopentane, butane, pentane, hexane, heptane or mixtures thereof.

10. Insulation comprising a foam prepared by the method of claim 1.

\* \* \* \* \*